United States Patent [19]
Hart et al.

[11] Patent Number: 5,941,280
[45] Date of Patent: Aug. 24, 1999

[54] PNEUMATICALLY DRIVEN TRAIN BRAKE PIPE PRESSURE EXHAUST VALVE

[75] Inventors: James E. Hart, Trafford, Pa.; Angel P. Bezos, Rockwood, Md.

[73] Assignee: Westinghouse Air Brake Company, Wilmerding, Pa.

[21] Appl. No.: 08/815,422

[22] Filed: Mar. 11, 1997

[51] Int. Cl.[6] .................................................. F16K 31/126
[52] U.S. Cl. .......................... 137/605; 137/607; 137/628; 251/61.2
[58] Field of Search ................................ 137/625, 625.12, 137/625.17, 628, 602, 605, 606, 607; 251/12, 61.3, 61.2, 61, 61.1, 61.4

[56] References Cited

U.S. PATENT DOCUMENTS

| | | | |
|---|---|---|---|
| 1,184,143 | 5/1916 | Slater | 137/605 |
| 2,639,908 | 5/1953 | Graham | 137/605 |
| 4,615,353 | 10/1986 | McKee | 251/61.2 X |
| 5,586,813 | 12/1996 | McKay et al. | 303/22.4 |

Primary Examiner—Kevin Lee
Attorney, Agent, or Firm—James Ray & Associates

[57] ABSTRACT

A valve device for reducing the brake pipe pressure in a railroad train brake pipe at a location remote from a train locomotive including a pair of valves, a first valve to controllably vent brake pipe pressure from the brake pipe for purposes of service brake applications and a second valve to quickly vent brake pipe pressure from the brake pipe at a relatively high rate for purposes of emergency brake applications, and a pneumatic drive means to open the first valve in response to a controlled supply pressure and open the second valve in response to an emergency supply pressure.

21 Claims, 2 Drawing Sheets

PNEUMATICALLY DRIVEN TRAIN BRAKE PIPE PRESSURE EXHAUST VALVE

FIELD OF THE INVENTION

The present invention relates, in general, to a pneumatic type brake pipe pressure regulating valve disposed at a location remote from a railroad locomotive for exhausting the air pressure present in the brake pipe of a railroad train substantially concurrently with a locomotive brake valve service reduction of brake pipe air pressure at the train locomotive and, more particularly, this invention relates to a regulating valve that utilizes a single pneumatic drive system for both a service brake application and an emergency brake application.

CROSS REFERENCE TO RELATED APPLICATIONS

The invention taught in this patent application is closely related to each of the inventions taught in a co-pending patent application, titled: "A TRAIN BRAKE PIPE PRESSURE EXHAUST CONTROL SYSTEM AND REGULATING VALVE THEREFORE", which was assigned Ser. No. 08/831,485, and was filed on Mar. 31, 1997. This patent application is assigned to the assignee of the present invention, and the teachings therein are incorporated into this patent application by reference thereto.

BACKGROUND OF THE INVENTION

There is currently an ongoing engineering effort, by suppliers of railway braking equipment, to develop an electro-pneumatic type brake system for railroad freight trains. It is generally acknowledged in the railroad industry that the development of such an electro-pneumatic brake control will substantially enhance the operation of a train by achieving a faster brake response, more equalized car retardation and a generally more uniform braking effort throughout a long train of cars.

These enhanced results are based on the assumption that all of the cars, or at least a majority of the cars, making up a train will be appropriately equipped for utilizing such improved electro-pneumatic braking system, in which case direct control of the brake cylinder air pressure is envisioned. With the possible exception of certain unit trains, however, it currently cannot be reasonably expected that any such majority of cars will be immediately implemented with the required electro-pneumatic brake equipment.

Accordingly, for the present, indirect brake cylinder air pressure control is contemplated, in which the train brake pipe air pressure is controlled not only at the locomotive, but also at one or several remote cars located throughout the train to accelerate the reduction of brake pipe air pressure in order to achieve a faster and more uniform brake response.

When the brake pipe pressure is reduced at any given point along the brake pipe, however, a transient low pressure is created in the vicinity of that point. Consequently, if the exhaust creating the transient low pressure is closed too quickly, i.e., before the entire length of the brake pipe pressure is stabilized, air will flow towards the low pressure point thereby causing a localized increase in pressure at that point which can cause control valves in that vicinity to inadvertently release.

On the other hand, if the exhaust is closed too slowly, the pressure will be reduced to a level below the desired target pressure. Therefore, anytime the air pressure is reduced at any one or more remote locations along the brake pipe, it is vitally necessary that a flow equilibrium be established and maintained thereat following reduction of the brake pipe pressure to a commanded target value. This then requires that an exhaust flow be carefully controlled to continuously match the changing flow of air from the rest of the brake pipe to the exhaust location.

At the present time, most railway freight trains are required to utilize an end-of-train unit disposed on the last car in the train. Such an end-of-train unit, among other highly critical functions, may be equipped to independently and remotely initiate a reduction of the brake pipe air pressure from the rear of the train in response to the train operator's activation of a special triggering device located in the cab of the locomotive. This may be accomplished, for example, by the operator transmitting a brake application command signal from the locomotive to the end-of-train unit via radio communication.

One approach to effecting such an air pressure reduction in the brake pipe has been to utilize a control valve which includes a variable type orifice through which the brake pipe air pressure is discharged. Normally, in these self-regulating type valves, either a spring setting against a pressurized area or a reference control pressure is utilized to effectively control the variable orifice.

In contrast thereto, nonself-regulating type valves require the use of a microprocessor to constantly monitor the brake pipe pressure to obtain pressure feedback information in order to establish an appropriate valve orifice size in response to a changing difference between the commanded target pressure and the feedback pressure. The above referenced co-pending patent application, Ser. No. 08/562,961, teaches one such nonself-regulating valve system utilizing a valve body having a single annular valve seat encircling a conical protrusion through which the brake pipe pressure is exhausted for both service and emergency brake applications.

SUMMARY OF THE INVENTION

This invention, according to a first aspect thereof, is predicated on the development of a new, unique and simplified valve body incorporating a variable orifice type valve through which the brake pipe pressure is discharged for service brake applications, whereby the variable orifice, and accordingly the discharge rate, can be regulated by electronic control of supply and exhaust solenoids based on brake pipe pressure feedback information received by a microprocessor; and further includes a separate and distinct dump valve arrangement which opens concurrently with the variable orifice type valve for emergency brake applications. In essence, the improved valve of this invention is intended to be incorporated into a more or less conventional radio control system for exhausting the brake pipe air pressure at the last car of the train in accordance with service, as well as emergency, brake application signals transmitted from the locomotive. In its broadest sense, the valve apparatus comprises a regulating valve device having two distinct valves controlled by a single pneumatic control system for reducing the brake pipe air pressure in the last car, or any selected car, with the first valve being an adjustable orifice type valve adapted to controllably vent air pressure from the brake pipe when the valve is at least in a partially open position, with the rate of discharge being in proportion to the extent the valve is open for the purpose of making a service brake application to a commanded target pressure and thereafter regulating the exhaust flow to maintain the target pressure as the brake pipe pressure gradient settles out; and the second valve being a dump valve, i.e., a valve capable of opening to provide a large orifice to quickly vent air pressure from the brake pipe at a more rapid rate consistent with the requirements for making an emergency brake application.

In a more specific aspect of the present invention, the regulating valve device comprises a valve body having at least one supply passage to which the brake pipe is connected, an exhaust passage open to atmosphere and a bore with which the supply passage and the exhaust passage are in fluid communication. A dual function valve stem is reciprocally disposed within the bore in which two separate valves are incorporated. A first valve of such dual function valve establishes an exhaust opening under control of a pneumatic drive means to effect a controlled brake pipe air pressure reduction for making service brake applications and a second valve of such dual function valve being a dump valve which can be opened by the same pneumatic drive means to provide a relatively large orifice to exhaust brake pipe air pressure at a more rapid rate for the purpose of making an emergency type brake application.

In an even more specific aspect of this invention, the regulating valve device comprises a valve means having two supply passages to which the brake pipe is connected. Both of these two supply passages are in fluid communication with the bore on either side of the exhaust passage. A reciprocal valve stem includes two valves, a first adjustable orifice valve between the first one of the supply passages and the exhaust passage and a second dump valve between the second one of the supply passages and the exhaust passage. A pneumatic drive means is responsive to a microprocessor controlled actuating pressure in order to controllably open the first valve for controlled brake pipe air pressure reductions for making a service brake application. The same pneumatic drive means will open the second valve in response to an emergency actuating pressure for a more rapid brake pipe air pressure reduction for purposes of making an emergency brake application.

According to another aspect, this invention provides a microprocessor controlled regulating valve device for use in an end-of-train unit disposed on a railway car at a location in a train remote from a locomotive. Such microprocessor controlled regulating valve device includes a microprocessor unit disposed in the end-of-train unit and is equipped to receive a brake command signal transmitted from such locomotive. A first pressure transducer is connected to a brake pipe disposed on such railway car for determining brake pipe air pressure and is connected for transmitting an electrical signal to such microprocessor unit representative of such brake pipe air pressure. There is a regulating valve disposed in such end-of-train unit that is connected to receive air pressure from such brake pipe and to exhaust air pressure therefrom at a first service rate and at a second emergency rate. Additionally, an electro-pneumatic control means is connected to receive air pressure from such brake pipe and electrical signals from the microprocessor unit for communicating control air pressure to such regulating valve in response to electrical signals received from such microprocessor unit.

OBJECTS OF THE INVENTION

It is, therefore, one of the primary objects of the present invention to incorporate in the end-of-train unit an electrically controlled pneumatic regulating valve device for venting the train brake pipe air pressure at a location remote from the locomotive in accordance with service, as well as emergency, brake application signals transmitted from the locomotive.

Another object of the present invention is to provide a valve device for exhausting the brake pipe air pressure at a location remote from the locomotive at a variable service rate as determined by the continually changing difference between brake pipe pressure and a commanded target pressure until the brake pipe pressure gradient stabilizes.

A further object of the present invention is to provide a valve device for reducing the brake pipe air pressure at a location remote from the locomotive which is capable of venting brake pipe air pressure for service brake applications at a first rate and for venting brake pipe air pressure at a second faster rate for emergency brake applications.

Still another object of the present invention is to provide a valve device for reducing the brake pipe air pressure at a location remote from the locomotive, as in the foregoing, that does not require the use of a relatively large air reservoir and can be suitably sized for installation in presently used end-of-train units.

An even further object of the present invention is to provide a valve device for reducing the brake pipe air pressure at a location remote from the locomotive, as in the foregoing, that has increased reliability and enhanced ruggedness.

In addition to the specific objects and advantages of the present invention described in some detail above, various other objects and advantages of the pneumatically driven train brake pipe pressure exhaust valve will become more readily apparent to those persons who are skilled in the relevant railway braking art from the following much more detailed description of the invention, particularly, when such detailed description is taken in conjunction with the attached drawing Figures and the appended claims.

BRIEF DESCRIPTION OF A PRESENTLY PREFERRED AND VARIOUS ALTERNATIVE EMBODIMENTS

OF THE PRESENT INVENTION

Figure 1:
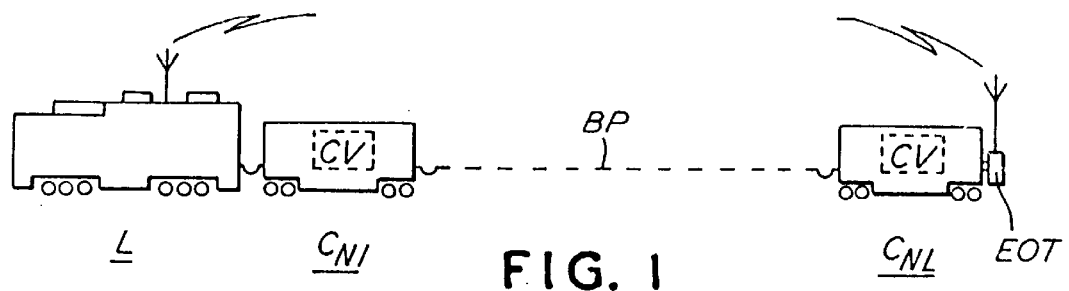
FIG. 1 is a schematic illustration of a railroad train having a plurality of freight cars headed by a locomotive which is in radio communication with an end-of-train unit disposed on the last car of the train.

Prior to proceeding to the more detailed description of the present invention, it should be noted that, for the sake of clarity and a fuller understanding of such invention, identical components which have identical functions have been identified with identical reference numerals and/or symbols throughout the several views illustrated in the attached drawings.

As best shown in FIG. 1, railroad cars $C_N$ which make up a train are physically coupled to a locomotive L by typical prior art type car couplers (not shown) and are further coupled pneumatically by a brake pipe BP that extends continuously from the locomotive L to the last car $C_{NL}$ in the train. Associated with the last car is an end-of-train unit EOT that is coupled to the locomotive L via radio communication.

The last car $C_{NL}$ of the train is further provided with a brake control valve device CV, as are all of the other cars $C_N$. These brake control valve devices CV are, preferably, an A.A.R. standard AB type control valve, such as an ABD, ABDW or ABDX control valve. Each of these standard AB type control valves is presently being manufactured by Westinghouse Air Brake Co. As is well known, these car control valve devices CV operate to control the car brakes in response to variations of the train brake pipe air pressure at the respective cars.

Figure 2:
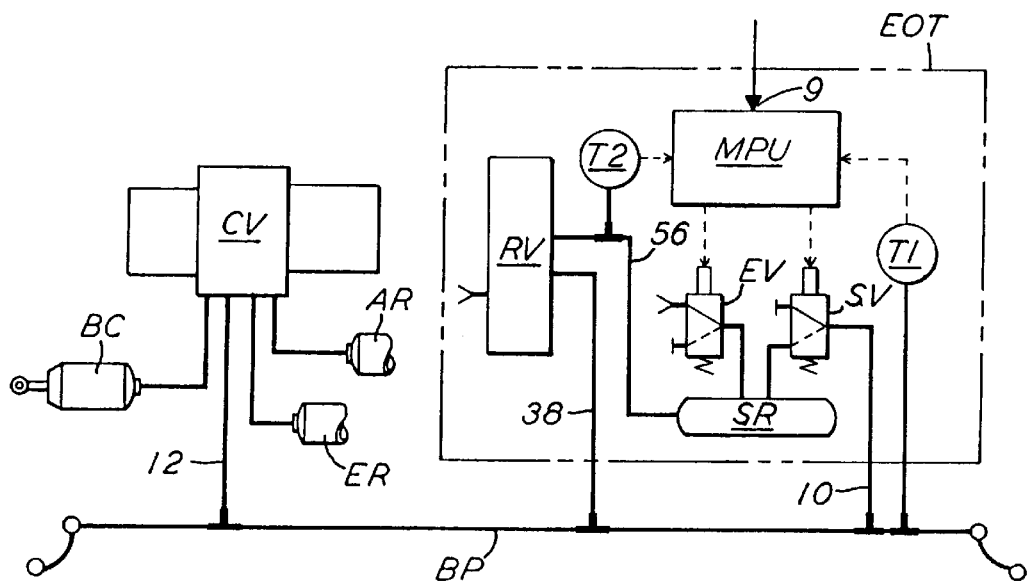
FIG. 2 is a block diagram of a microprocessor based indirect brake cylinder air pressure control system adapted for end-of-train service as can be utilized in conjunction with the presently preferred embodiment of the pneumatic controlled valve device of the invention.

Reference is now made to FIG. 2. Illustrated therein is an end-of-train unit EOT which includes a microprocessor unit MPU. This microprocessor unit MPU, at relatively frequent intervals, monitors the existing brake pipe pressure in brake pipe BP. Such monitoring of the brake pipe pressure is achieved by a first pressure transducer T1 which will transmit a signal to such microprocessor unit MPU that is representative of the brake pipe pressure in brake pipe BP.

The microprocessor unit MPU is programmed to compare the existing brake pipe pressure as represented by the signal from the pressure transducer T1 to a given target pressure. This given target pressure is supplied to the microprocessor unit MPU as an input signal 9 transmitted via radio transmission from the locomotive for either a controlled brake pipe air pressure reduction for making a service brake application or a quick and substantial brake pipe air pressure reduction for making an emergency brake application.

In addition, a second pressure transducer T2 monitors the air pressure in the stability reservoir SR and transmits a signal to the microprocessor unit MPU that is representative of this pressure. In response to these signals, the microprocessor unit MPU in turn selectively operates an exhaust solenoid valve EV and/or a supply solenoid valve SV, to which the brake pipe BP is connected by a branch pipe 10 and accordingly operates brake pipe air pressure regulating valve device RV.

Exhaust solenoid valve EV and supply solenoid valve SV are normally closed, solenoid operated, spring returned valves, as are common in such equipment. Pursuant to such operation, the microprocessor unit MPU either opens supply solenoid valve SV to admit pressurized air to a stability reservoir SR, or opens exhaust solenoid valve EV to vent pressurized air from stability reservoir SR. The controlled pressure within stability reservoir SR is responsible for operation of pneumatic drive 15 on pressure regulating valve device RV, and accordingly the essential operation of regulating valve device RV, as necessary to either controllably open a service valve 20 or an emergency valve 22, as described below.

Each car $C_N$, including the last car $C_{NL}$, has its control valve CV connected to such brake pipe BP via branch pipe 12. Control valve CV on each car is associated with an auxiliary reservoir AR and an emergency reservoir ER that are charged via such brake pipe BP and provide a source of compressed air for operating the car's brake cylinder device BC in response to service and emergency rates of reduction in the brake pipe air pressure.

Control valve device CV, connected to brake pipe BP via branch pipe 12, operates in response to increasing brake pipe air pressure to charge the auxiliary reservoir AR and the emergency reservoir ER to the operating pressure of brake pipe BP, while concurrently venting the car's brake cylinder device BC. Such operation is well-known to those skilled in the art, being known as "release and charging", and thus requires no further explanation.

Figure 3:
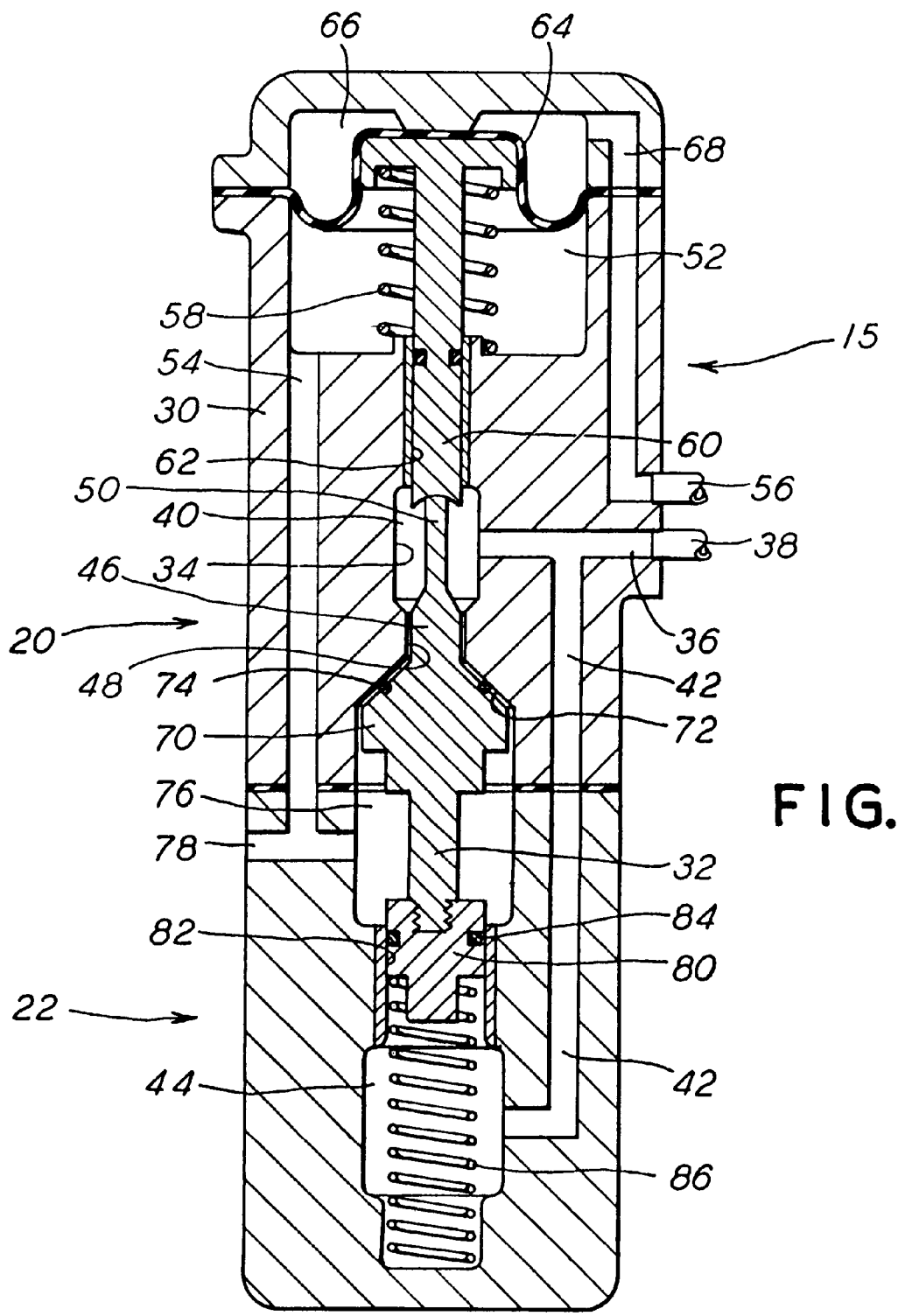
FIG. 3 is a diagrammatic, cross-sectional view showing a presently preferred embodiment of the pneumatic controlled valve device of this invention for carrying out service and emergency reduction of brake pipe air pressure in accordance with the indirect brake cylinder pressure control system illustrated in FIG. 2.

In accordance with the embodiment illustrated in FIG. 3, the valve device RV of this invention comprises a valve housing 30 with an elongated valve stem 32. Such elongated valve stem 32 is reciprocally disposed within an elongated bore 34 that is centrally disposed within valve housing 30.

A primary supply passage 36 extends from an upper portion of such elongated bore 34, namely receiving chamber 40, to which the brake pipe BP is connected via primary supply pipe 38. Accordingly, the receiving chamber 40 is normally charged with compressed air at brake pipe pressure. Branch supply passage 42 extends from the primary supply passage 36 to similarly maintain the emergency chamber 44 charged with compressed air at brake pipe pressure.

In normal operation, i.e., with control chamber 66 vented consistent with the absence of either a service or an emergency brake application, such service valve 20 and the emergency valve 22 are each in a closed position, thereby allowing the pressure within chambers 40 and 44 to be maintained in accordance with the operating pressure in the brake pipe BP.

With further regard to elongated valve stem 32, a small cylindrical upper end 50 thereof extends upwardly from the service valve 20 within the receiving chamber 40. Chamber 40 forms a part of the elongated bore 34 and serves as the terminus of such primary supply passage 36. Service valve 20 is disposed immediately below receiving chamber 40 and is adapted to vent brake pipe air pressure from such receiving chamber 40 for the purpose of making a service brake application.

As can be seen, the service valve 20 comprises a male conical valve head portion 70 circumferentially disposed on such elongated valve stem 32 and is adapted to seat within a female conical valve seat 72 which forms a part of the bore 34. There is an O-ring type seal 74 provided on the conical valve head portion 70 to prevent escape of brake pressure from the receiving chamber 40 when the service valve 20 is intended to be closed. An exit chamber 76 is provided below service valve 20 into which conical valve head 70 recedes when such service valve 20 is opened and which is in fluid communication with exhaust passage 78.

Accordingly, when service valve 20 is even partially opened, air pressure within such receiving chamber 40 will pass into the exit chamber 76 and further pass to the atmosphere via such exhaust passage 78.

With regard to service valve 20, it can be seen that a cylindrical portion 46 of the valve stem 32 is disposed at the apex of the male conical valve head 70, which is reciprocally disposed within a cylindrical port 48. The clearance between such cylindrical portion 46 and the cylindrical port 48 is restricted so that the venting of brake pipe air pressure therethrough is also restricted and slowed to thereby permit a rather exacting control of brake pipe air pressure venting through such service valve 20, as is normally necessary for making a service brake application.

A reciprocal piston element 80, forming a part of elongated valve stem 32, is provided below the exhaust passage 78. Such piston element 80 is adapted for reciprocal motion within cylinder port 82 which forms a part of bore 34. Here again, there is an O-ring seal 84, preferably, provided on such piston element 80 to prevent escape of brake pipe air pressure from the emergency exhaust chamber 44 which is disposed below cylinder port 82. There is a compression spring 86 compressively disposed between the under-side of such piston element 80 and the base of bore 34 which serves to bias the valve stem 32 upward.

The combination of the piston element 80, the cylindrical port 82 and the emergency exhaust chamber 44 all serve to form a second valve, namely the emergency valve 22, which is opened when such piston element 80 moves downwardly sufficient to clear the lower edge of such cylinder port 82 to thereby expose the exhaust chamber 44 to both the chamber 76 and the exhaust passage 78.

The pneumatic drive 15 is incorporated into the upper portion of such valve housing 30 and comprises a diaphragm operated piston member 60 that is operatively disposed for reciprocal motion within a guide bore 62. The diaphragm 64 separates the control chamber 66 on the upper side from the atmospheric chamber 52 on the lower side. This control chamber 66 is connected to a control passage 68 to admit control pressure from the stability reservoir SR via control supply pipe 56 while the atmospheric chamber 52 is vented to atmosphere via outlet 54.

The base of piston member 60 is disposed to directly engage the cylindrical push stem at the upper end 50 of valve stem 32 so that any downward motion of such piston member 60 resulting from an increase in control pressure within control chamber 66 will cause the valve stem 32 to be moved downward within such bore 34. Compression spring 58 is disposed between the head portion on the piston member 60 and a horizontal portion of housing 30 to bias such piston member 60 upwardly when the pressures in such control chamber 66 and such atmospheric chamber 52 are equal, thereby assuring that valves 20 and 22 are closed.

As should be readily apparent, just a small minor downward movement of such valve stem 32 will normally be sufficient to open the valve 20, but a significant major downward movement would be required to open the valve 22.

Pursuant to normal operation, the brake pipe BP will be charged to the train operating air pressure by movement of the locomotive brake valve handle (not shown) to a release position in a manner well-known in the railroad industry. The branch pipe 12 conducts compressed air from such brake pipe BP to each control device CV disposed on each car $C_N$ thereby charging each auxiliary reservoir AR and each emergency reservoir ER and exhausting any compressed air in each brake cylinder BC.

Concurrently with the charging of the brake pipe BP, a corresponding radio signal is transmitted to the EOT unit at the last car $C_{NL}$. Microprocessor MPU operates in response to this radio signal to close the supply solenoid valve SV and to open solenoid exhaust valve EV in order to maintain atmospheric pressure within such stability reservoir SR. With atmospheric pressure within stability reservoir SR, such pressure will also be maintained within such control chamber 66 which will equalize the pressures in both the control chamber 66 and the atmospheric chamber 52 so that springs 58, 86 are effective to urge piston member 60 to its uppermost position in which both valves 20 and 22 are closed.

When it is desired to make a service brake application following charging of the brake pipe BP, the locomotive brake valve (not shown) is set in a position to achieve a brake pipe air pressure reduction to the degree of brake pipe pressure reduction corresponding to the degree of brake application desired. This reduction of brake pipe air pressure constitutes a pneumatic signal that propagates through the train from front to rear via such brake pipe BP.

Concurrently, a service brake command signal is transmitted via radio from the locomotive to the end-of-train unit EOT corresponding to the reduced locomotive brake pipe air pressure. Microprocessor unit MPU operates in response to that service brake command signal to selectively open the supply solenoid valve SV to effect a controlled increase of control pressure within the stability reservoir SR. This increased control pressure within such stability reservoir SR, as determined by the second pressure transducer T2, is matched within control chamber 66, to the extent that such piston member 60 is controllably forced downward and accordingly opens valve 20 against the combined force exerted by springs 58, 86. When the control pressure within the stability reservoir SR is equal to the pressure within control chamber 66, the supply solenoid valve SV and the exhaust solenoid valve EV are closed. In other words, the system is now operated in a lap condition.

For further control of routine service brake applications, the microprocessor MPU will selectively open and close either the supply solenoid valve SV or the exhaust solenoid valve EV to regulate the control pressure within such stability reservoir SR in response to appropriate signals received by the EOT unit to accordingly cause application and release of such service brake as signaled.

When an emergency brake application is desired, microprocessor MPU receives the appropriate radio signal from the locomotive and, in this case, the microprocessor MPU will quickly and fully open the supply solenoid valve SV causing such supply reservoir SR to be charged with compressed air at full brake pipe pressure, which in response thereto will comparably charge the control chamber 66 which will cause the piston member 60 to be forced downward to the maximum extent possible thereby fully opening valve 22.

Specifically, by moving the valve stem 32 downward to the maximum extent, such piston element 80 is caused to move below the cylindrical port 82 thereby permitting the pressurized air in the emergency chamber 44 to be quickly vented via the chamber 76 and exit passage 78. At the same time, the valve 20 is also opened to its maximum extent in order to vent the brake pipe air pressure from such chamber 40. Obviously, the size of piston element 80 and its displacement from cylindrical port 82 when valve 20 is fully open must be such that the rate of brake pipe pressure reduction via valve 20 will be sufficiently fast enough to cause emergency brake application.

With both valves 20 and 22 fully opened, the brake pipe air pressure in chambers 40 and 44 is quickly vented via outlet 78 and the air pressure within such brake pipe BP is quickly vented via branch passages 42, 36 and line 38, which will accordingly cause application of the emergency brake via control valve CV in a well-known manner.

As should be apparent from the above detailed description, a number of modifications and other embodiments could be incorporated without departing from the spirit of the invention. Therefore, while the detailed description above represents the preferred valve and valve control arrangement, it should be apparent that a great number of changes could be incorporated and varied embodiments could be devised without departing from either the spirit of the invention or the scope of the appended claims.

We claim:

1. A regulating valve device for reducing air pressure in a brake pipe disposed on a railroad train at a location remote from a train locomotive, said regulating valve device comprising:

a. a first valve having an orifice disposed within said regulating valve device and adapted to be in one of a closed position and an open position, said open position adapted to discharge air pressure from such brake pipe at a rate of discharge in proportion to an extent said first valve is open;

b. a second valve disposed within said regulating valve device and adapted to be in one of a closed position and an open position, said open position adapted to quickly discharge air pressure from such brake pipe at a rate of discharge sufficient to cause an emergency brake application; and c. a pneumatic drive means adapted to selectively open said first valve and said second valve to effect said air pressure reductions in such brake pipe, said pneumatic drive means being responsive to a controlled first supply pressure to at least partially open said first valve without opening said second valve to effect a controlled air pressure reduction in such brake pipe through said first valve and responsive to an emergency second supply pressure to open said second valve to effect quick discharge of air pressure in such brake pipe at said rate sufficient to cause said emergency brake application.

2. A regulating valve device, according to claim 1, wherein said controlled first supply pressure has a magnitude responsive to a signal from such train locomotive for making said controlled air pressure reduction in such brake pipe for making a service brake application and said emergency second supply pressure has a magnitude responsive to a signal from such train locomotive for making said air pressure reduction in such brake pipe at said quick discharge rate for making said emergency brake application.

3. A regulating valve device, according to claim 1, wherein said first valve and said second valve are incorporated within a single valve stem reciprocally operated by said pneumatic drive means.

4. A regulating valve device, according to claim 1, wherein said first valve is adapted to be opened by said controlled first supply pressure.

5. A regulating valve device, according to claim 4, wherein both said first valve and said second valve are open in making such emergency brake application.

6. A regulating valve device, according to claim 1, wherein said pneumatic drive means includes a diaphragm operated piston member.

7. A regulating valve device, according to claim 1, wherein said first valve includes a male conical valve head engageable with a female conical valve seat.

8. A regulating valve device, according to claim 1, wherein said second valve includes a male cylindrical valve body reciprocally disposed within a mating female cylindrical valve seat.

9. A regulating valve device for reducing air pressure in a brake pipe disposed on a railroad train at a location remote from a train locomotive, said regulating valve device comprising:

a. a supply passage to which such brake pipe is connected;

b. an exhaust passage open to atmosphere;

c. an elongated bore having each of said supply passage and said exhaust passage in fluid communication therewith;

d. a valve stem disposed within said elongated bore and adapted for reciprocal motion within said elongated bore;

e. a first valve having an orifice incorporated with said valve stem and adapted for reciprocal motion with said valve stem between a closed position and an open position to selectively close, open and partially open said supply passage to said exhaust passage;

f. a second valve incorporated with said valve stem and adapted for reciprocal motion with said valve stem between a closed and an open position to selectively open and close said supply passage to said exhaust passage; and g. a pneumatic drive means adapted to move said valve stem to open said first valve and said second valve, said pneumatic drive means being responsive to a controlled first supply pressure to at least partially open said first valve without opening said second valve to effect a controlled air pressure reduction in such brake pipe through said first valve, and responsive to an emergency second supply pressure to open said second valve to effect a quick air pressure reduction in such brake pipe at a rate sufficient to cause an emergency brake application.

10. A regulating valve device, according to claim 9, wherein said regulating valve device includes a pair of supply passages each of which is connected to such brake pipe and is in fluid communication with said elongated bore and said first valve is adapted to exhaust air pressure from such brake pipe via a first of said supply passages and said second valve is adapted to exhaust air pressure from such brake pipe via a second of said supply passages.

11. A regulating valve device, according to claim 9, wherein said first valve includes a male conical valve head reciprocally disposed on said valve stem engageable with a female conical valve seat forming a first wall portion of said elongated bore.

12. A regulating valve device, according to claim 9, wherein said second valve includes a male cylindrical valve body reciprocally disposed on said valve stem which engages a mating female cylindrical valve seat forming a second wall portion of said elongated bore.

13. A regulating valve device, according to claim 9, wherein said pneumatic drive means includes a diaphragm operated piston member adapted to reciprocally move said valve stem.

14. A regulating valve device, according to claim 9, wherein said regulating valve device further includes a compression spring adapted to bias said valve stem to a closed position where both said first valve and said second valve are in a closed position in the absence of said first and second supply pressures.

15. A regulating valve device for reducing air pressure in a brake pipe disposed on a railroad train at a location remote from a train locomotive, said regulating valve device comprising:

a. an elongated valve stem reciprocally disposed within an elongated bore;

b. a first supply passage to which such brake pipe is connected in fluid communication with a first end of an elongated bore;

c. a second supply passage to which such brake pipe is connected in fluid communication with a second end of said elongated bore;

d. an exhaust passage open to atmosphere and in fluid communication with said elongated bore between said first and second supply passages;

e. a compression spring disposed within said elongated bore and adapted to bias said elongated valve stem to a closed position;

f. a first valve incorporated with said valve stem between said first supply passage and said exhaust passage;

g. a second valve incorporated with said valve stem between said second supply passage and said exhaust passage; and h. a pneumatic drive means adapted to move said elongated valve stem and open said first valve and said second valve, said pneumatic drive means being responsive to a controlled first supply pressure to at least partially open said first valve without opening said second valve to effect a controlled air pressure reduction in such brake pipe through said first valve, and responsive to an emergency second supply pressure to open said second valve to effect a quick air pressure reduction in such brake pipe through said second valve at a rate sufficient to cause an emergency brake application.

16. A regulating valve device, according to claim 15, wherein said pneumatic drive means is adapted to fully open both said first valve and said second valve in response to said emergency second supply pressure.

17. A regulating valve device, according to claim 15, wherein said first valve includes a male conical valve head on said valve stem engageable with a female conical valve seat forming a first wall portion of said elongated bore.

18. A regulating valve device, according to claim 17, wherein said male conical valve head further includes a cylindrical valve body within a closely spaced cylindrical valve seat on said female valve seat adapted to restrict and slowly vent compressed air through said first valve.

19. A regulating valve device, according to claim 15, wherein said second valve includes a male cylindrical valve body on said valve stem reciprocally disposed within a mating female cylindrical valve seat forming a second wall portion of said elongated bore.

20. A regulating valve device, according to claim 15, wherein said pneumatic drive means includes a diaphragm operated piston member.

21. A regulating valve device, according to claim 20, wherein said diaphragm operated piston member is activated by a control chamber to which said controlled first supply pressure and said emergency second supply pressure are admitted.

* * * * *